(12) United States Patent
Chitraputhiran et al.

(10) Patent No.: US 11,775,558 B1
(45) Date of Patent: Oct. 3, 2023

(54) SYSTEMS AND METHODS FOR AUTOMATIC MANAGEMENT OF DATABASE DATA REPLICATION PROCESSES

(71) Applicant: FMR LLC, Boston, MA (US)

(72) Inventors: Balasubramanian Chitraputhiran, Chennai (IN); Sachin Samuel, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/717,978

(22) Filed: Apr. 11, 2022

(51) Int. Cl.
*G06F 16/00* (2019.01)
*G06F 16/27* (2019.01)

(52) U.S. Cl.
CPC .................. *G06F 16/27* (2019.01)

(58) Field of Classification Search
CPC ..................................................... G06F 16/27
See application file for complete search history.

(56) References Cited

U.S. PATENT DOCUMENTS

| 10,826,975 | B2 | 11/2020 | Revanuru et al. | |
| 2003/0014432 | A1* | 1/2003 | Teloh | G06F 11/2074 714/E11.107 |
| 2005/0193031 | A1* | 9/2005 | Midgley | G06F 11/1464 |
| 2007/0277010 | A1* | 11/2007 | Anand | G06F 11/1458 711/162 |
| 2012/0136827 | A1* | 5/2012 | Wang | G06F 11/2097 707/623 |
| 2019/0166022 | A1 | 5/2019 | Revanuru | |
| 2020/0301947 | A1 | 9/2020 | Botev et al. | |

* cited by examiner

*Primary Examiner* — Khanh B Pham
(74) *Attorney, Agent, or Firm* — Cesari & McKenna, LLP (57) ABSTRACT

Systems and methods are described herein for stopping a data replication process on database systems. The method includes identifying a data replication process corresponding to a downstream database system and an upstream database system. The method also includes determining a first status of the data replication process at the downstream database system and upstream data corresponding to the upstream database system. The method also includes determining a second status of the data replication process at the upstream database system based on the upstream data. The method also includes stopping the data replication process at the upstream database system based on the second status and stopping the data replication process at the downstream database system based on the first status. The method also includes generating a data log notification including data corresponding to the stopped data replication process.

8 Claims, 10 Drawing Sheets

SYSTEMS AND METHODS FOR AUTOMATIC MANAGEMENT OF DATABASE DATA REPLICATION PROCESSES

TECHNICAL FIELD

The present invention relates generally to systems and methods for managing data replication processes on databases, including systems and methods for stopping and initiating data replication processes on databases.

BACKGROUND

Modern organizations rely on databases to store data. Generally, there are software tools that allow organizations to replicate, filter, and transform data from one database to another database. However, there are instances (e.g., maintenance activities) during which replication processes have to be stopped or halted manually, and reinitiated manually. Manually stopping and initiating replication processes can be especially cumbersome as the number of databases involved increases. Therefore, there is a need for a software tool that is able to automatically manage data replication processes across a number of databases.

SUMMARY

Accordingly, an object of the invention is to provide systems and methods for automatically managing a data replication process on a number of database systems. It is an object of the invention to provide systems and methods for stopping a data replication process on a number of database systems. It is an object of the invention to provide systems and methods for generating a data log corresponding to a stopped data replication process. It is an object of the invention to provide systems and methods for initiating a data replication process on a number of database systems. It is an object of the invention to provide systems and methods for generating a data log corresponding to an initiated data replication process.

In some aspects, a computerized method for stopping a data replication process on database systems includes identifying a data replication process corresponding to a downstream database system and an upstream database system. The computerized method also includes determining a first status of the data replication process at the downstream database system and upstream data corresponding to the upstream database system. The computerized method also includes determining a second status of the data replication process at the upstream database system based on the upstream data. The computerized method further includes stopping the data replication process at the upstream database system based on the second status. The computerized method also includes stopping the data replication process at the downstream database system based on the first status. The computerized method further includes generating a data log notification including data corresponding to the stopped data replication process.

In some embodiments, the first status of the data replication process at the downstream database system includes at least one of process lag, abend state, or replicate presence. In some embodiments, the second status of the data replication process at the upstream database system includes at least one of process lag or abend state. In some embodiments, the computerized method includes storing the upstream data in a data file. In some embodiments, the data log notification includes an email.

In some embodiments, stopping the data replication process at the downstream database system occurs after stopping the data replication process at the upstream database system. For example, in some embodiments, stopping the data replication process at the downstream database system occurs a period of time after stopping the data replication process at the upstream database system. In some embodiments, the period of time is at least one minute.

In some aspects, a system for stopping a data replication process on database systems includes a server computing device communicatively coupled to a database systems over a network. The server computing device is configured to identify a data replication process corresponding to a downstream database system and an upstream database system. The server computing device is also configured to determine a first status of the data replication process at the downstream database system and upstream data corresponding to the upstream database system. The server computing device is also configured to determine a second status of the data replication process at the upstream database system based on the upstream data. The server computing device is further configured to stop the data replication process at the upstream database system based on the second status. The server computing device is also configured to stop the data replication process at the downstream database system based on the first status. The server computing device is further configured to generate a data log notification including data corresponding to the stopped data replication process.

In some embodiments, the first status of the data replication process at the downstream database system includes at least one of process lag, abend state, or replicate presence. In some embodiments, the second status of the data replication process at the upstream database system includes at least one of process lag or abend state. In some embodiments, the server computing device is further configured to store the upstream data in a data file. In some embodiments, the data log notification includes an email.

In some embodiments, stopping the data replication process at the downstream database system occurs after stopping the data replication process at the upstream database system. For example, in some embodiments, stopping the data replication process at the downstream database system occurs a period of time after stopping the data replication process at the upstream database system. In some embodiments, the period of time is at least one minute.

In some aspects, a computerized method for initiating a data replication process on database systems includes identifying a data replication process corresponding to a downstream database system and an upstream database system. The computerized method also includes determining a first status of the data replication process at the downstream database system and a second status of the data replication process at the upstream database system. The computerized method further includes initiating the data replication process at the downstream database system based on the first status. The computerized method also includes initiating the data replication process at the upstream database system based on the second status. The computerized method further includes generating a data log notification including data corresponding to the initiated data replication process.

In some embodiments, the first status of the data replication process at the downstream database system includes at least one of process lag, abend state, or replicate presence. In some embodiments, the second status of the data replication process at the upstream database system includes at least one of process lag or abend state. In some embodiments, the data log notification includes an email.

In some embodiments, initiating the data replication process at the upstream database system occurs after initiating the data replication process at the downstream database system. For example, in some embodiments, initiating the data replication process at the upstream database system occurs a period of time after initiating the data replication process at the downstream database system. In some embodiments, the period of time is at least one minute.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In some aspects, the systems and methods described herein can include one or more mechanisms or methods for automatically managing a data replication process on a number of database systems. The systems and methods described herein can include mechanisms or methods for stopping a data replication process on a number of database systems. The systems and methods described herein can include mechanisms or methods for generating a data log corresponding to a stopped data replication process. The systems and methods described herein can include mechanisms or methods for initiating a data replication process on a number of database systems. The systems and methods described herein can include mechanisms or methods for generating a data log corresponding to an initiated data replication process.

Figure 1:
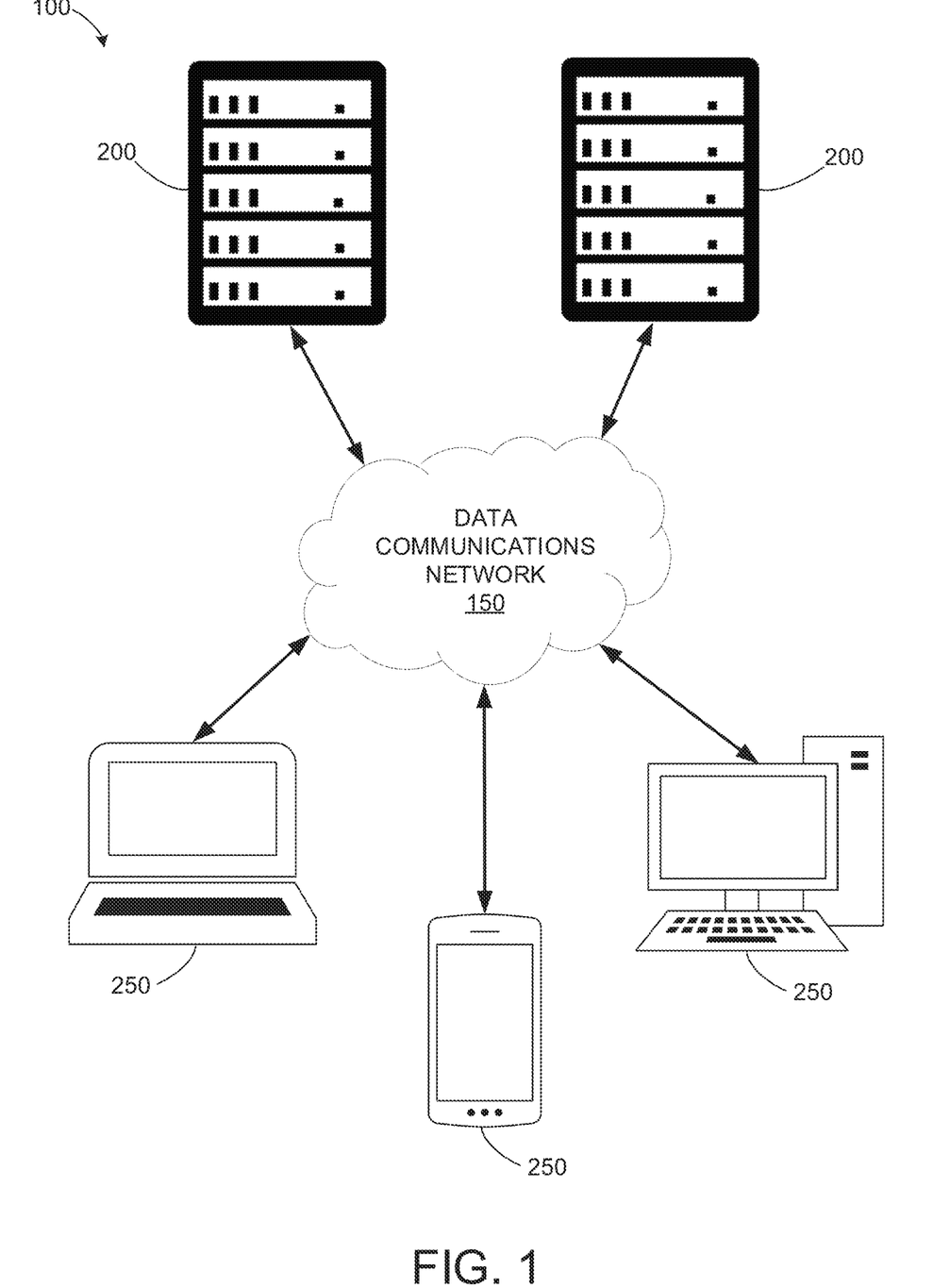
FIG. 1 is a block diagram of an exemplary data communications network, according to embodiments of the technology described herein.
Figure 2:
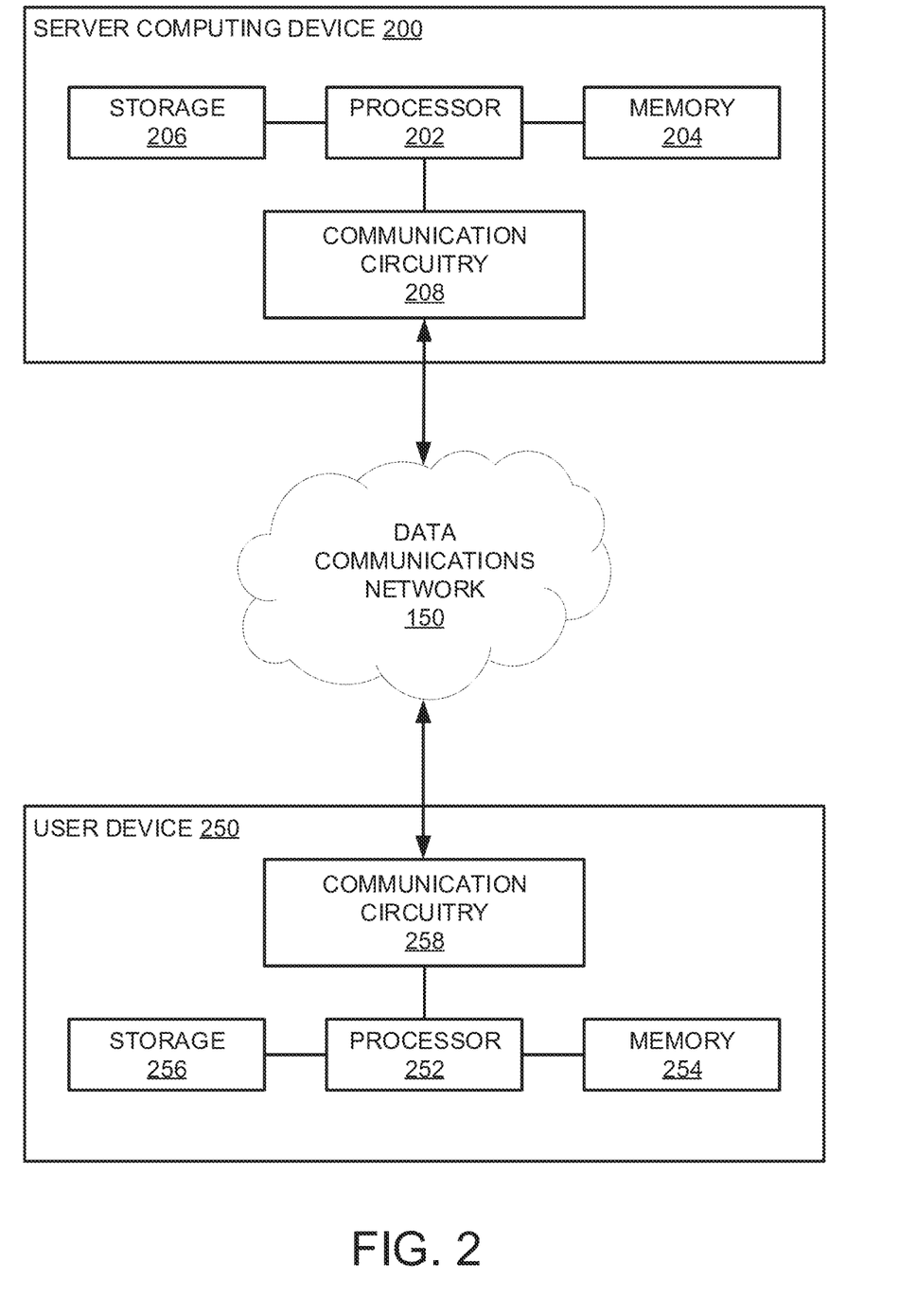
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
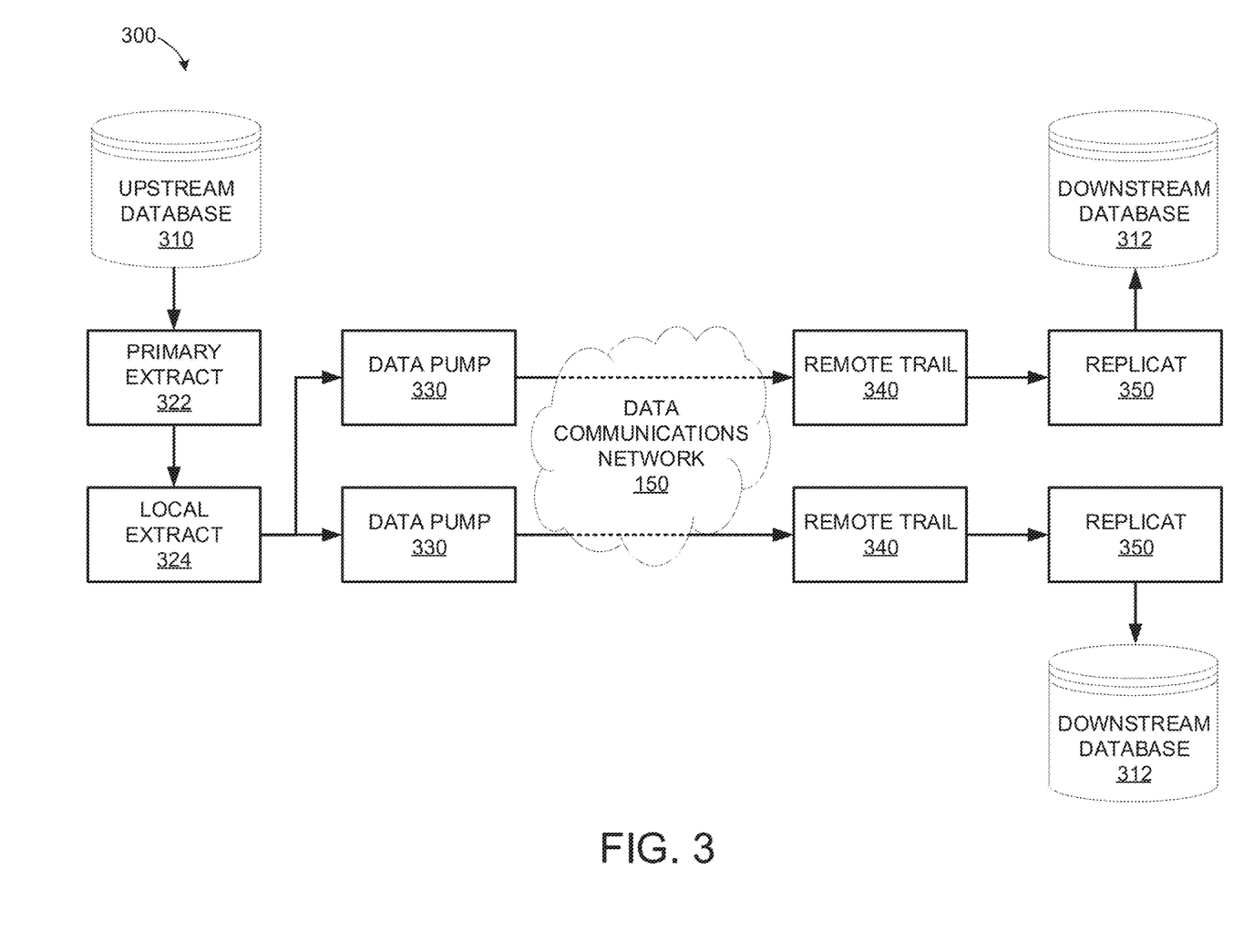
FIG. 3 is a block diagram of an exemplary system for database data replication, according to embodiments of the technology described herein.
Figure 4A:
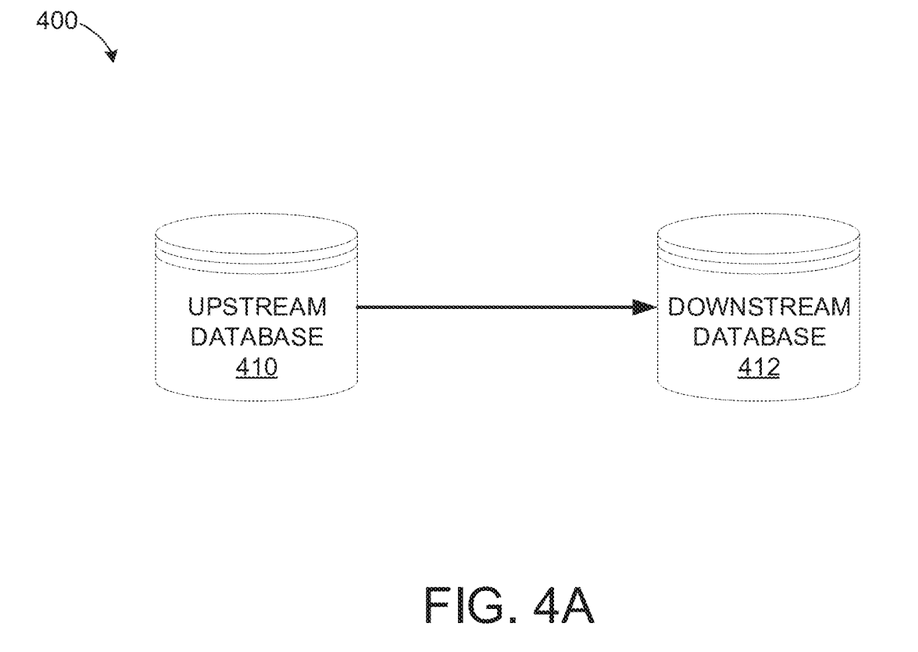
FIG. 4A is a block diagram of an exemplary unidirectional data replication process, according to embodiments of the technology described herein.
Figure 4B:
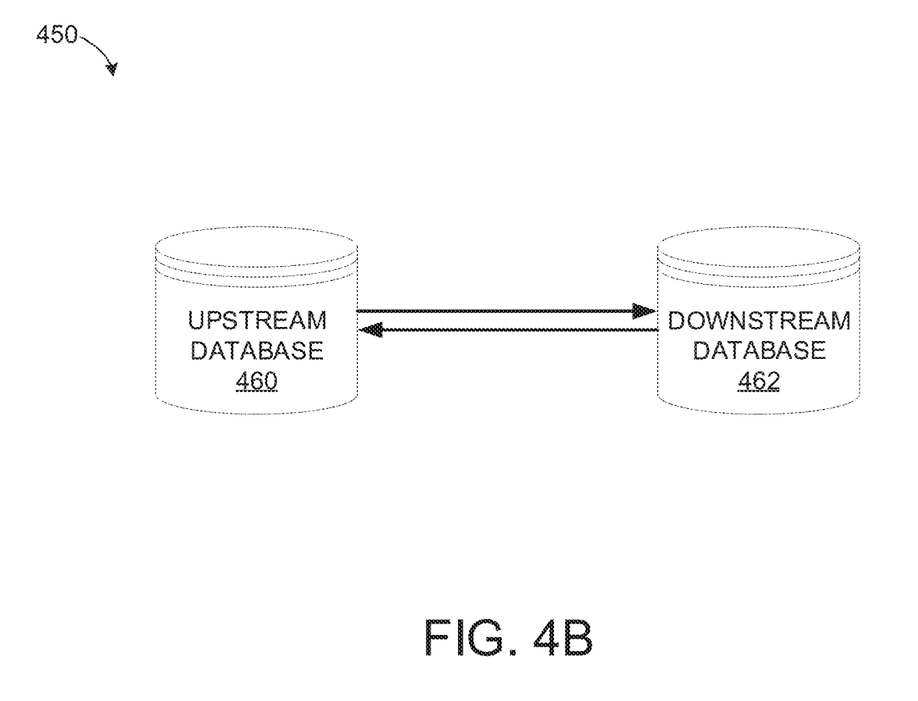
FIG. 4B is a block diagram of an exemplary bi-directional data replication process, according to embodiments of the technology described herein.

Referring to FIG. 3, a system 300 for database data replication is illustrated. System 300 allows for the replication, filtering, and transformation of data from one database to another database. For example, system 300 allows for the replication of data from upstream database 310 to one or more downstream databases 312. System 300 includes primary extract module 322 and local extract module 324. Primary extract module 322 and local extract module 324 are configured to extract data from upstream database 310 and provide the data to data pump module 330. Data pump module 330 is configured to transfer the extracted data to remote trail module 340 over data communications network 150. Remote trail module 340 and replicat module 350 are configured to transfer the extracted data to downstream database 312 for replication.

Figure 5:
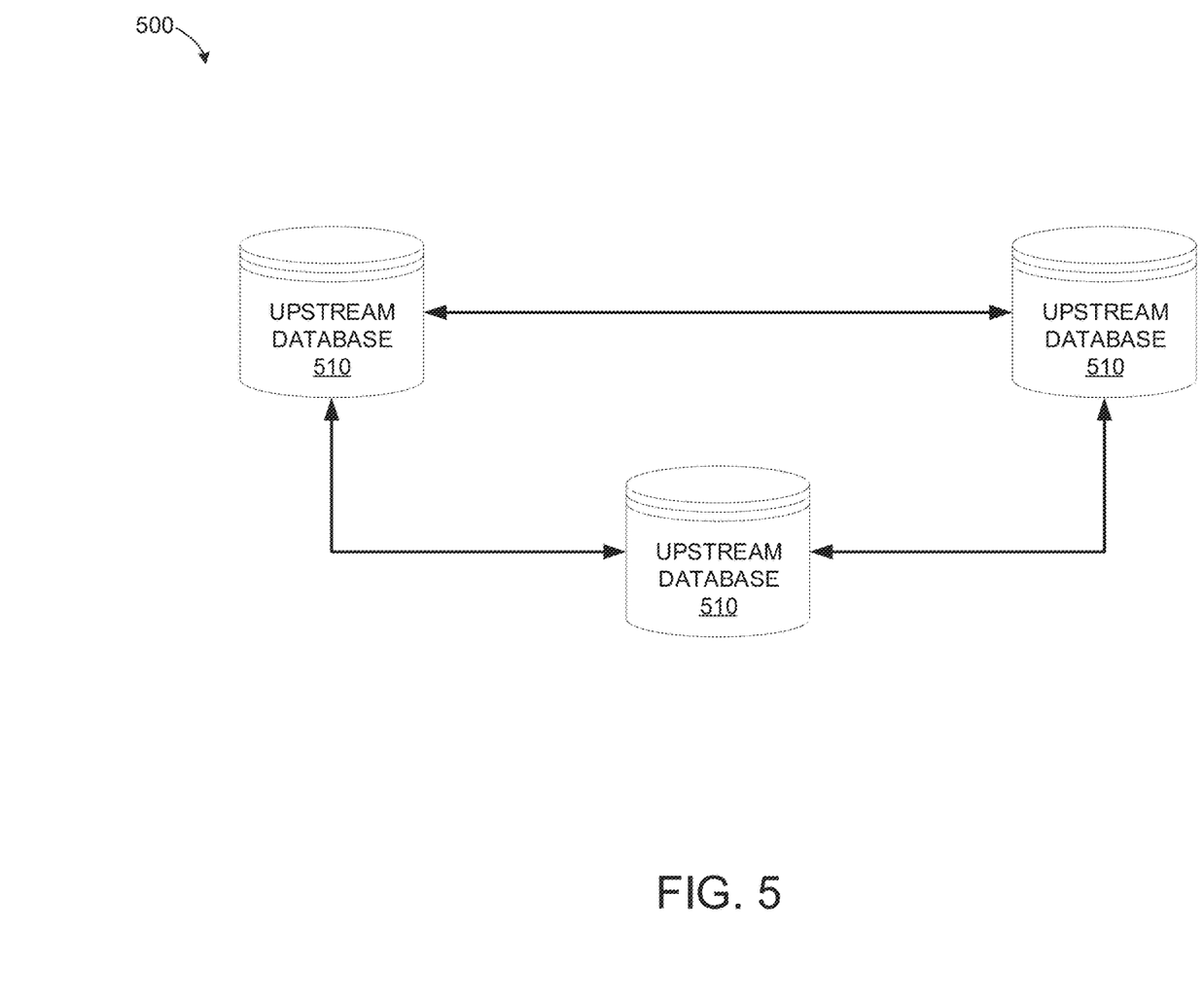
FIG. 5 is a block diagram of an exemplary peer-to-peer data replication process, according to embodiments of the technology described herein.

FIGS. 4-8 illustrate examples of database data replication configurations using system 300. Referring to FIGS. 4A and 4B, an exemplary unidirectional data replication process 400 between upstream database 410 and downstream database 412, and an exemplary bi-directional data replication process 450 between upstream database 460 and downstream database 462 is illustrated. Referring to FIG. 5, an exemplary peer-to-peer data replication process 500 between a group of upstream databases 510 is illustrated.

Figure 6:
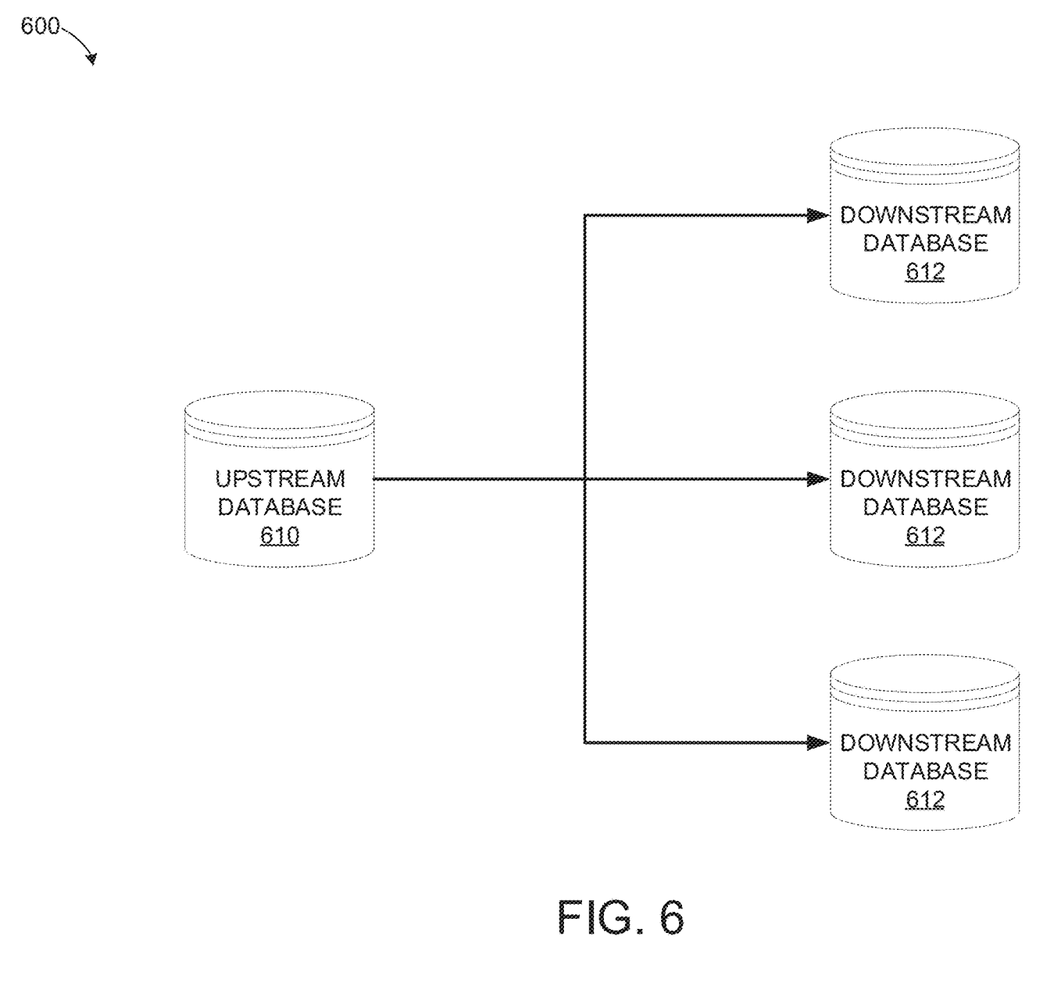
FIG. 6 is a block diagram of an exemplary broadcast data replication process, according to embodiments of the technology described herein.
Figure 7:
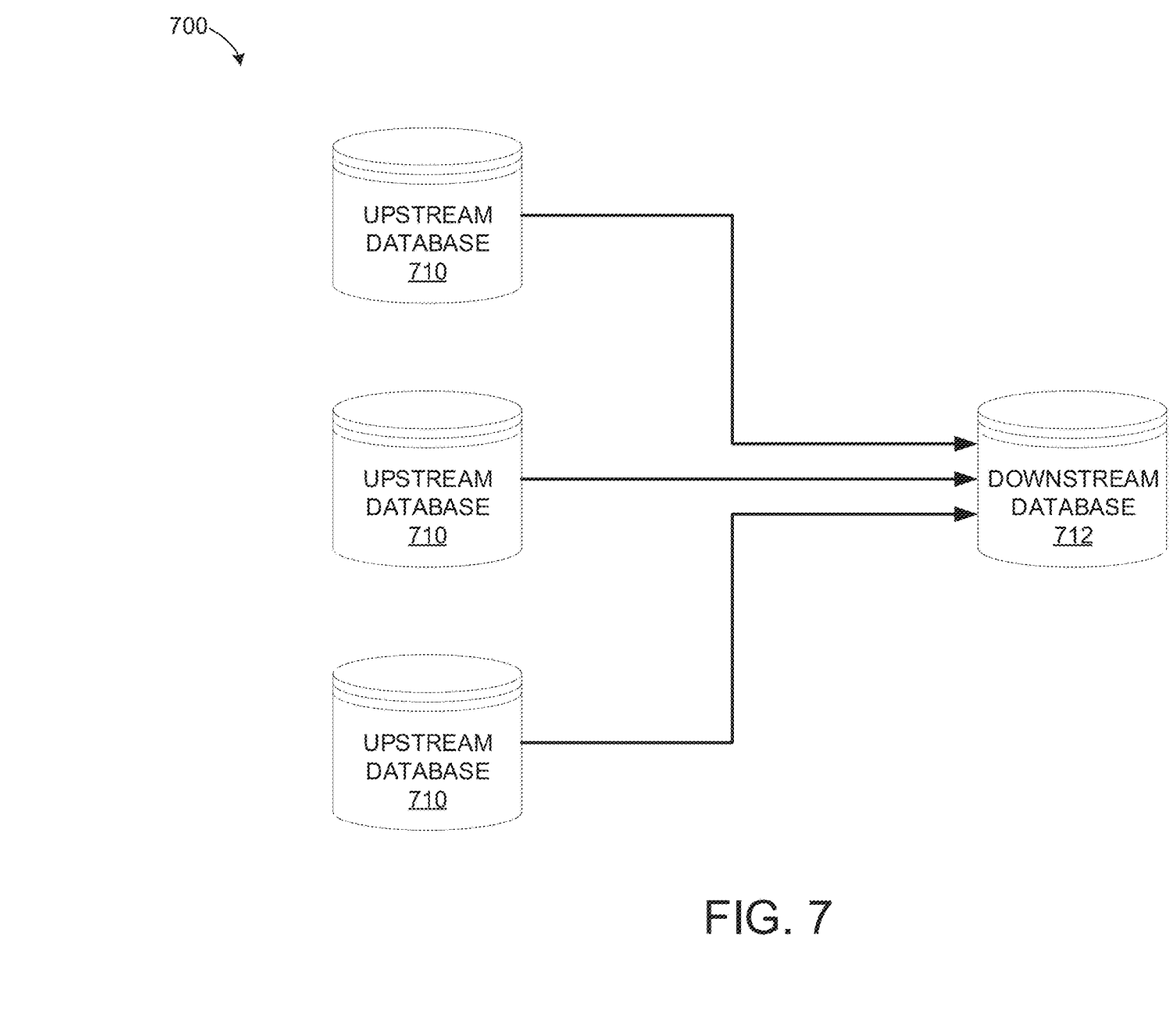
FIG. 7 is a block diagram of an exemplary consolidation data replication process, according to embodiments of the technology described herein.
Figure 8:
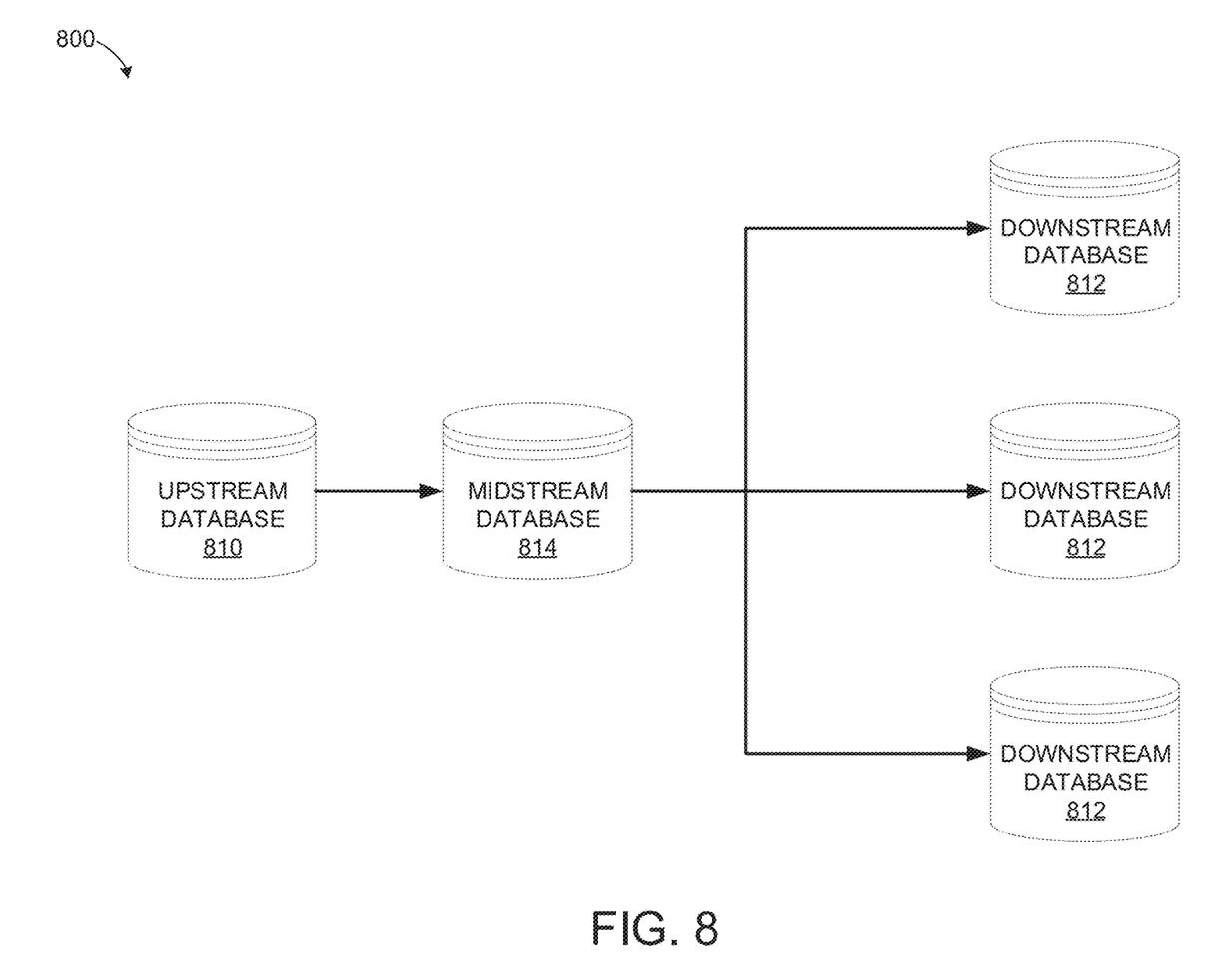
FIG. 8 is a block diagram of an exemplary cascading data replication process, according to embodiments of the technology described herein.

Referring to FIG. 6, an exemplary broadcast data replication process 600 between one upstream database 610 and a group of downstream databases 612 is illustrated. Referring to FIG. 7, an exemplary consolidation data replication process 700 between a group of upstream databases 710 and one downstream database 712 is illustrated. Referring to FIG. 8, an exemplary cascading data replication process 800 between an upstream database 810, a midstream database 814, and a group of downstream databases 812 is illustrated.

Figure 9:
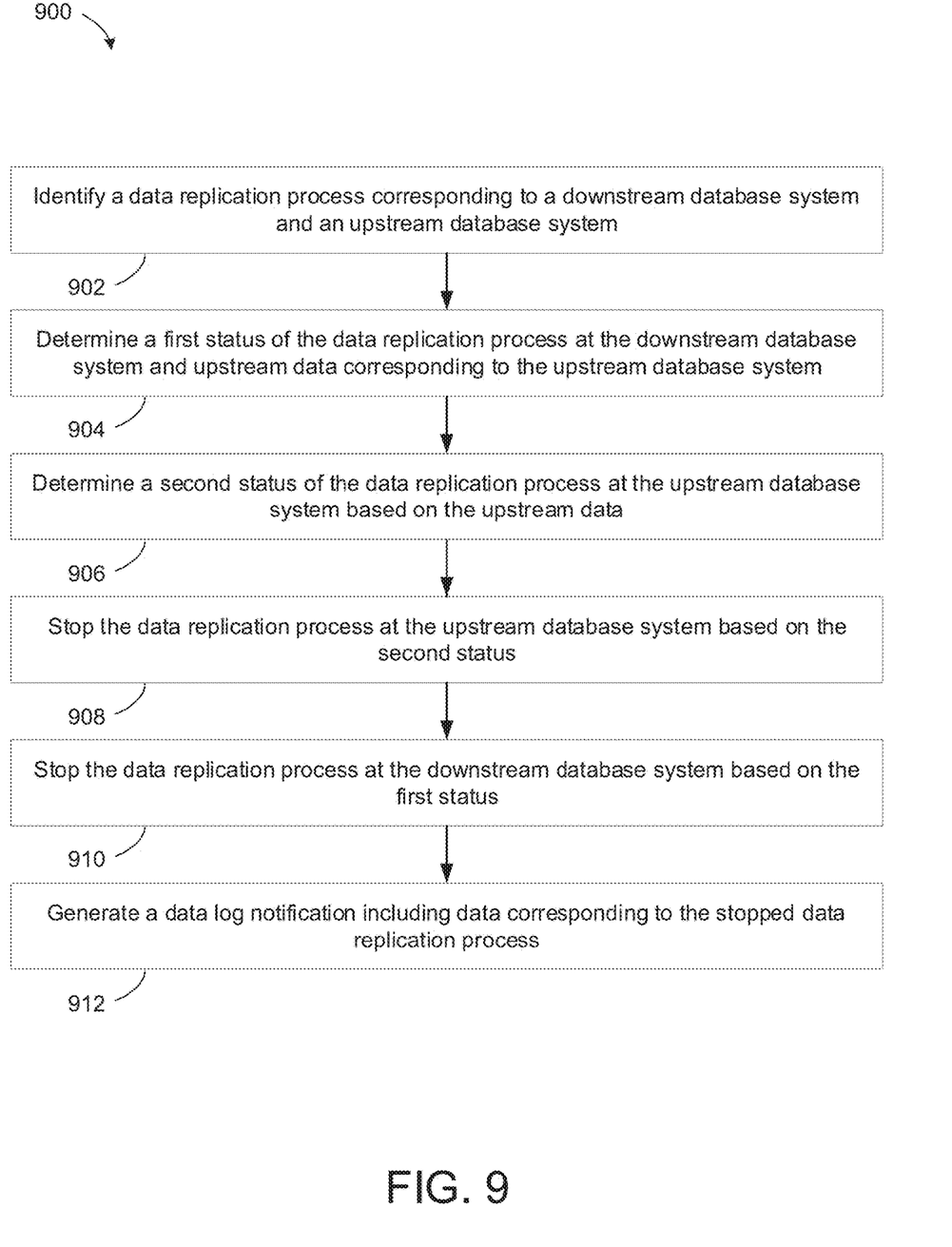
FIG. 9 is a flow diagram of a computer-implemented method for stopping a data replication process on database systems, according to embodiments of the technology described herein.

Referring to FIG. 9, a process 900 for stopping a data replication process on database systems includes identifying a data replication process corresponding to a downstream database system and an upstream database system in step 902. Process 900 continues by determining a first status of the data replication process at the downstream database system and upstream data corresponding to the upstream database system in step 904. In some embodiments, the first status of the data replication process at the downstream database system includes at least one of process lag, abend state, or replicat presence. Process 900 continues by determining a second status of the data replication process at the upstream database system based on the upstream data in step 906. In some embodiments, the second status of the data replication process at the upstream database system includes at least one of process lag or abend state.

Process 900 continues by stopping the data replication process at the upstream database system based on the second status in step 908. Process 900 continues by stopping the data replication process at the downstream database system based on the first status in step 910. In some embodiments, stopping the data replication process at the downstream database system occurs after stopping the data replication process at the upstream database system. For example, in some embodiments, stopping the data replication process at the downstream database system occurs a period of time after stopping the data replication process at the upstream database system. In some embodiments, the period of time is at least one minute. Process 900 finishes by generating a data log notification including data corresponding to the stopped data replication process in step 912. For example, in some embodiments, the data log notification includes an email. In some embodiments, process 900 continues by storing the upstream data in a data file.

Process 900 can be implemented using system 300 for stopping a data replication process on database systems. System 300 can include a server computing device 200 communicatively coupled to database systems over a network 150. The server computing device 200 is configured to identify a data replication process corresponding to a downstream database system and an upstream database system.

The server computing device 200 is also configured to determine a first status of the data replication process at the downstream database system and upstream data corresponding to the upstream database system. In some embodiments, the first status of the data replication process at the downstream database system includes at least one of process lag, abend state, or replicat presence. The server computing device 200 is further configured to determine a second status of the data replication process at the upstream database system based on the upstream data. In some embodiments, the second status of the data replication process at the upstream database system includes at least one of process lag or abend state.

The server computing device 200 is also configured to stop the data replication process at the upstream database system based on the second status. The server computing device 200 is further configured to stop the data replication process at the downstream database system based on the first status. In some embodiments, stopping the data replication process at the downstream database system occurs after stopping the data replication process at the upstream database system. For example, in some embodiments, stopping the data replication process at the downstream database system occurs a period of time after stopping the data replication process at the upstream database system. In some embodiments, the period of time is at least one minute.

The server computing device 200 is also configured to generate a data log notification including data corresponding to the stopped data replication process. For example, in some embodiments, the data log notification includes an email. In some embodiments, the server computing device 200 is further configured to store the upstream data in a data file.

Figure 10:
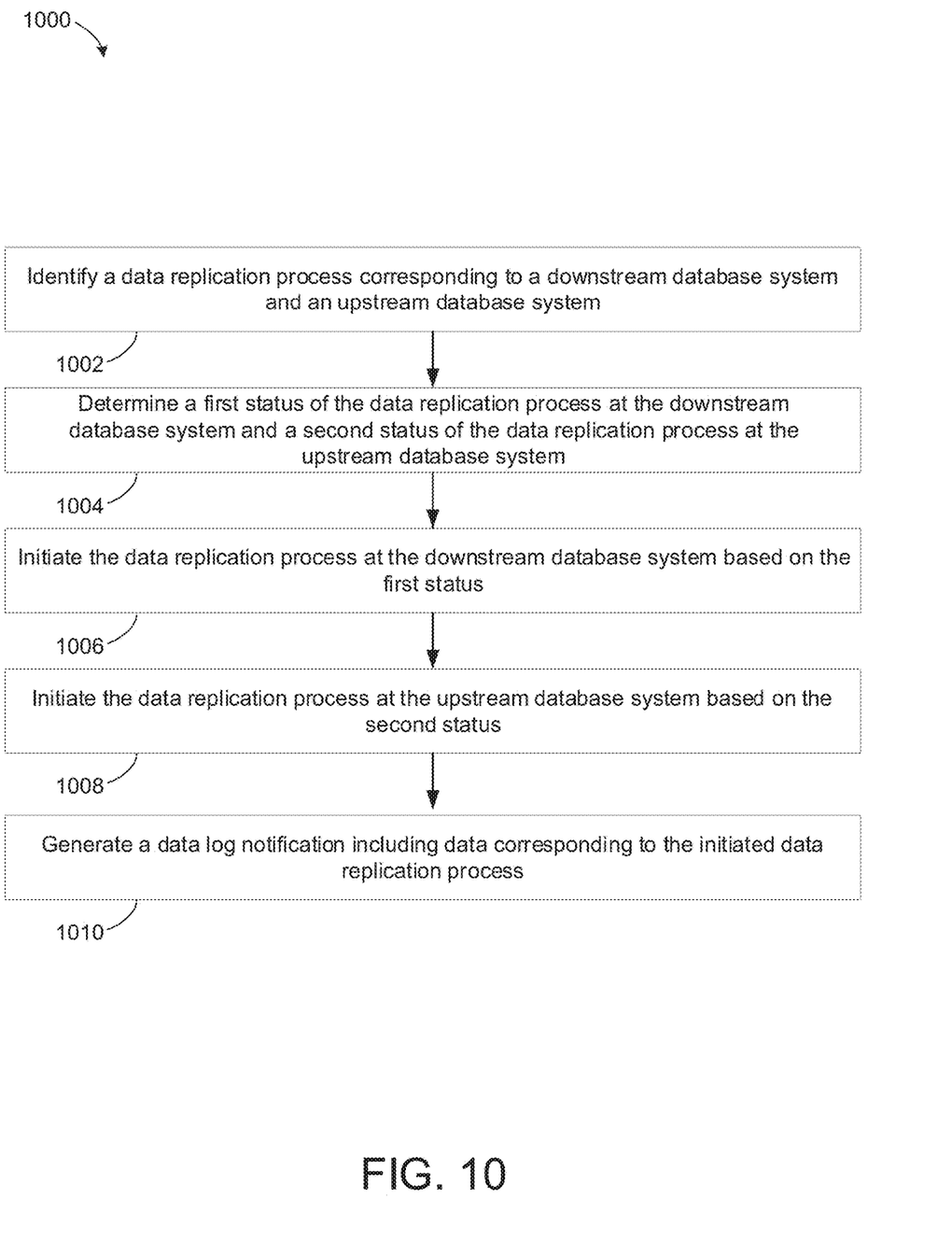
FIG. 10 is a flow diagram of a computer-implemented method for initiating a data replication process on database systems, according to embodiments of the technology described herein.

Referring to FIG. 10, a process 1000 for initiating a data replication process on database systems includes identifying a data replication process corresponding to a downstream database system and an upstream database system in step 1002. Process 1000 continues by determining a first status of the data replication process at the downstream database system and a second status of the data replication process at the upstream database system in step 1004. In some embodiments, the first status of the data replication process at the downstream database system includes at least one of process lag, abend state, or replicate presence. In some embodiments, the second status of the data replication process at the upstream database system includes at least one of process lag or abend state.

Process 1000 continues by initiating the data replication process at the downstream database system based on the first status in step 1006. Process 1000 continues by initiating the data replication process at the upstream database system based on the second status in step 1008. In some embodiments, initiating the data replication process at the upstream database system occurs after initiating the data replication process at the downstream database system. For example, in some embodiments, initiating the data replication process at the upstream database system occurs a period of time after initiating the data replication process at the downstream database system. In some embodiments, the period of time is at least one minute. Process 1000 finishes by generating a data log notification including data corresponding to the initiated data replication process. In some embodiments, the data log notification includes an email.

Process 1000 can be implemented using system 300 for initiating a data replication process on database systems. System 300 can include a server computing device 200 communicatively coupled to database systems over a network 150. The server computing device 200 is configured to identify a data replication process corresponding to a downstream database system and an upstream database system. The server computing device 200 is also configured to determine a first status of the data replication process at the downstream database system and a second status of the data replication process at the upstream database system. In some embodiments, the first status of the data replication process at the downstream database system includes at least one of process lag, abend state, or replicat presence. In some embodiments, the second status of the data replication process at the upstream database system includes at least one of process lag or abend state.

The server computing device 200 is also configured to initiate the data replication process at the downstream database system based on the first status. The server computing device 200 is further configured to initiate the data replication process at the upstream database system based on the second status. In some embodiments, initiating the data replication process at the upstream database system occurs after initiating the data replication process at the downstream database system. For example, in some embodiments, initiating the data replication process at the upstream database system occurs a period of time after initiating the data replication process at the downstream database system. In some embodiments, the period of time is at least one minute. The server computing device 200 is also configured to generate a data log notification including data corresponding to the initiated data replication process. For example, in some embodiments, the data log notification includes an email.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for stopping and restarting a data replication process on a plurality of database systems, the method comprising:
    identifying, by a server computing device, a data replication process corresponding to a plurality of downstream database system instances and an associated upstream database system, the data replication process comprising programmatic instructions to perform (i) extraction of data from the upstream database system via a primary extract process and a local extract process, (ii) transmission of the extracted data from a data pump process to a remote trail file store via a communications network, and (iii) replication of the extracted data from the remote trail file store to each of the downstream database system instances;
    determining, by the server computing device, a first replication status of the data replication process at each of the downstream database system instances by:
        connecting to the downstream database system instance,
        checking for a lag state or an abend state associated with the data replication process at the downstream database system instance, and
        determining whether the data replication process is active at the downstream database system instance;
    determining, by the server computing device, a second replication status of the data replication process at the upstream database system by:
        connecting to the upstream database system, and
        checking whether a lag state or an abend state exists at the upstream database system;
    stopping, by the server computing device, the data replication process at the upstream database system when the second replication status indicates one or more of:
        that a lag state exists at the upstream database system or that an abend state exists at the upstream database system;
    stopping, by the server computing device, the data replication process at the downstream database system instances when the first replication status of the data replication process at the downstream database system instance indicates one or more of:
        that a lag state exists at the downstream database system instance, that an abend state exists at the downstream database system instance; or when the second replication status of the data replication process indicates that the data replication process is not active at the upstream database system;
    generating, by the server computing device, a first data log notification comprising data corresponding to the stopped data replication process at the upstream database system and at each of the downstream database system instances;
    restarting, by the server computing device, the data replication process at each of the downstream database instances and associating the data replication process with the upstream database system;
    restarting, by the server computing device, the data replication process at the upstream database system, including restarting the primary extract process, the local extract process, and the data pump process; and
    generating, by the server computing device, a second data log notification comprising data corresponding to the restarted data replication process.

2. The computerized method of claim 1, wherein stopping the data replication process at each of the downstream database system instances occurs after stopping the data replication process at the upstream database system.

3. The computerized method of claim 2, wherein stopping the data replication process at each of the downstream database system instances occurs a period of time after stopping the data replication process at the upstream database system.

4. The computerized method of claim 3, wherein the period of time comprises at least one minute.

5. A system for stopping and restarting a data replication process on a plurality of database systems, the system comprising a server computing device communicatively coupled to a plurality of database systems over a network, the server computing device having a memory for storing computer-executable instructions and a processor that executes the computer-executable instructions to:
    identify a data replication process corresponding to plurality of downstream database system instances and an associated upstream database system, the data replication process comprising programmatic instructions to perform (i) extraction of data from the upstream database system via a primary extract process and a local extract process, (ii) transmission of the extracted data from a data pump process to a remote trail file store via a communications network, and (iii) replication of the extracted data from the remote trail file store to each of the downstream database system instances;
    determine a first replication status of the data replication process at each of the downstream database system instances by:
        connecting to the downstream database system instance,
        checking for a lag state or an abend state associated with the data replication process at the downstream database system instance, and determining whether the data replication process is active at the downstream database system instance;

determine a second replication status of the data replication process at the upstream database system by:
connecting to the upstream database system, and checking whether a lag state or an abend state exists at the upstream database system;

stop the data replication process at the upstream database system when the second replication status indicates one or more of: that a lag state exists at the upstream database system or that an abend state exists at the upstream database system;

stop the data replication process at the downstream database system instances when the first replication status of the data replication process at the downstream database system instance indicates one or more of: that a lag state exists at the downstream database system instance, that an abend state exists at the downstream database system instance; or when the second replication status of the data replication process indicates that the data replication process is not active at the upstream database system;

generate a first data log notification comprising data corresponding to the stopped data replication process at the upstream database system and at each of the downstream database system instances;

restart the data replication process at each of the downstream database instances and associating the data replication process with the upstream database system;

restart the data replication process at the upstream database system, including restarting the primary extract process, the local extract process, and the data pump process; and generate a second data log notification comprising data corresponding to the restarted data replication process.

6. The system of claim 5, wherein stopping the data replication process at each of the downstream database system instances occurs after stopping the data replication process at the upstream database system.

7. The system of claim 6, wherein stopping the data replication process at each of the downstream database system instances occurs a period of time after stopping the data replication process at the upstream database system.

8. The system of claim 7, wherein the period of time comprises at least one minute.

* * * * *